US006729422B2

(12) United States Patent
Chu et al.

(10) Patent No.: US 6,729,422 B2
(45) Date of Patent: May 4, 2004

(54) DETACHABLE TRANSMISSION MECHANISM FOR A WHEEL CHAIR AND DRIVING DEVICE THEREOF

(76) Inventors: Simon Chu, 111 Railroad Ave., Glenside, PA (US) 19038; Chih-Chin Hsieh, 7F, No. 16-5, Jian Kang Road, Taipei (TW); Tseng-Chien Lin, No. 169, Nan-Ya Street, Hsinchu (TW)

( * ) Notice: Subject to any disclaimer, the term of this patent is extended or adjusted under 35 U.S.C. 154(b) by 0 days.

(21) Appl. No.: 10/229,006

(22) Filed: Aug. 28, 2002

(65) Prior Publication Data

US 2004/0007401 A1 Jan. 15, 2004

(30) Foreign Application Priority Data

Jul. 12, 2002 (TW) .................................... 091210657 A

(51) Int. Cl.[7] ................................................ B62D 61/10

(52) U.S. Cl. .......................... 180/13; 180/15; 180/907; 192/69.43; 192/69.62

(58) Field of Search .............................. 180/13, 15, 11, 180/12, 16, 23, 24, 208, 209, 285, 65.1, 907; 280/304.1, 250.1; 192/69.62, 69.43, 69.4

(56) References Cited

U.S. PATENT DOCUMENTS

| | | | | | |
|---|---|---|---|---|---|
| 232,926 | A | * | 10/1880 | Berkholz | 192/69.62 |
| 3,889,773 | A | * | 6/1975 | Chant | 180/65.2 |
| 4,386,672 | A | * | 6/1983 | Coker | 180/13 |
| 4,503,925 | A | * | 3/1985 | Palmer et al. | 180/13 |
| 4,555,197 | A | * | 11/1985 | Erickson | 403/1 |
| 5,222,567 | A | * | 6/1993 | Broadhead et al. | 180/15 |
| 5,494,126 | A | * | 2/1996 | Meeker | 180/13 |
| 5,651,422 | A | * | 7/1997 | Casali | 180/13 |
| 6,619,456 | B1 | * | 9/2003 | Juhl | 192/69.43 |

* cited by examiner

*Primary Examiner*—Anne Marie Boehler
(74) *Attorney, Agent, or Firm*—Troxell Law Office PLLC

(57) ABSTRACT

A detachable transmission mechanism for a wheel chair includes a control unit, two support frames, a suspension frame and a driving device. The channel clamps of the two support frames can be connected to two lower transverse rods of an existing wheel chair and the joining tubes at two sides of the battery unit is connected to the joining pipe so that the battery unit can be fixed beneath a seat of the wheel chair; furthermore, the control unit is positioned on one side of one of armrest of the wheel chair so that in case of the handle being rotated, the vertical shaft, rotary plate and the connecting rod can move relatively and in turn rotate the suspension frame as well as the driving device; and when a control switch is turned on, the driving wheel can be rotated in either forward or reversed direction and thus move the wheel chair forward or backward.

10 Claims, 4 Drawing Sheets

DETACHABLE TRANSMISSION MECHANISM FOR A WHEEL CHAIR AND DRIVING DEVICE THEREOF

BACKGROUND OF THE INVENTION

1. Field of the Invention

The present invention relates to a detachable transmission mechanism for a wheel chair and a driving device in the transmission mechanism and particularly to an electric transmission mechanism for a wheel chair, with which an existing wheel chair can be attached by way of DIY (Doing It Yourself). Further, a revised driving device of the wheel chair is provided in the present invention in which a driving wheel can be rotationally moved with electric power or in a state of idling by way of a manual controller being operated to join with the driving wheel selectively.

2. Description of Related Art

The wheel chair was specially developed for handicapped or slowly moved aged persons and while a user sits in the wheel chair and pushes both lateral large wheels with both hands actuating grip rings coaxially connecting with the large wheels, the movement of the wheel chair can be obtained purposely. A weak person or a hand-hindered person resulting from illness or wound usually is unable to exert a force to the large wheels so that it is necessary to ask some other persons for gripping the handles at rear side of the wheel chair before the wheel chair can be moved. Hence, the conventional wheel chair has to be assisted by the user himself or any other person in order to meet the basic requirement of movement.

Accordingly, the so called electric wheel chair has been developed and the feature of the electric wheel chair is a transmission mechanism is provided under a "h" shaped seat, that is, one of two rear wheels is designed as the driving wheel and the other one rear wheel is the follower wheel so as to constitute a basis of moving forward. Two front wheels are controlled by a stir stem located at the armrests being shifted to front, rear, left or right so that the wheel chair can move toward a direction desired by the user. Although the conventional wheel chair has a good and easily operated control device, there still are following deficiencies: 1) the transmission mechanism of the electric wheel chair has to be driven with the electric power and it becomes unmoved in case of the electric power is depleted and the basic function of manual drive has lost; 2) In order to obtain the effect of speed differential (that is, the inner side rear wheel has a less rotational speed than the outer side rear wheel) for the two rear wheels and to avoid turning over or a risk of being unable to turn during the wheel chair making a turn, a sophisticate speed change box has to be mounted between the two rear wheels so that it increases the complicity of the transmission mechanism of the wheel chair; and 3) due to both the body and the transmission mechanism of the conventional electric wheel chair being made with complication, the production cost thereof is pretty high so that the retail price thereof is much more expensive and is not possible to become prevalent among handicapped and motion hindered persons.

SUMMARY OF THE INVENTION

An object of the present invention is provide a detachable transmission mechanism for a wheel chair, which includes a control unit, two support frames, a suspension frame and a driving device. The channel clamps of the two support frames can be connected to two lower transverse rods of an existing wheel chair and the joining tubes at two sides of the battery unit is connected to the joining pipe so that the battery unit can be fixed beneath a seat of the wheel chair; furthermore, the control unit is positioned on one side of one of armrest of the wheel chair so that in case of the handle being rotated, the vertical shaft, rotary plate and the connecting rod can move relatively and in turn rotate the suspension frame as well as the driving device; and when a control switch is turned on, the driving wheel can be rotated in either forward or reversed direction and thus move the wheel chair forward or backward.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
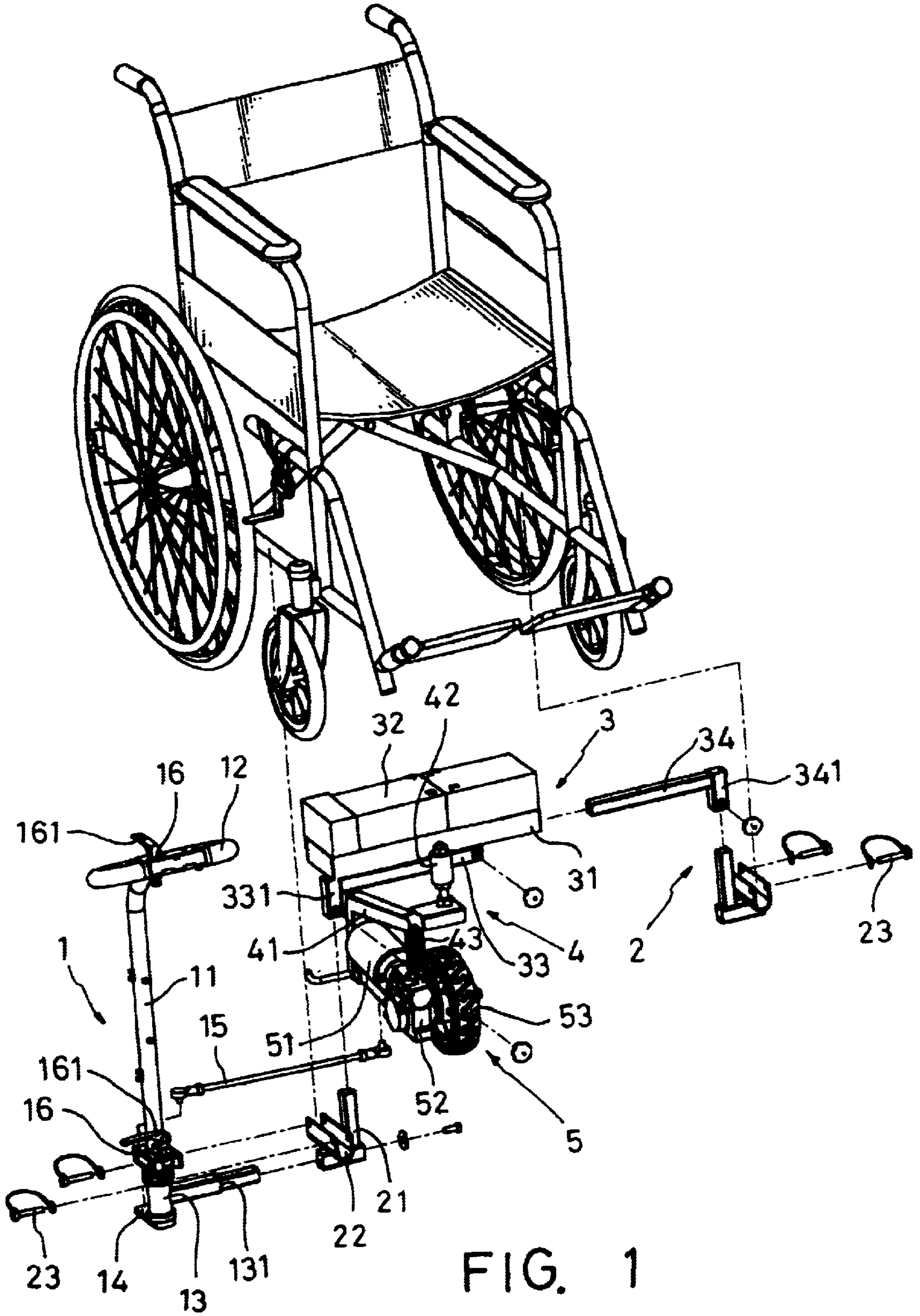
FIG. 1 is an exploded perspective view of a detachable transmission mechanism and a wheel chair attached with the transmission mechanism according to the present invention.

Referring to FIGS. 1 through 4, the transmission mechanism of the present invention basically includes a control unit 1, two support frames 2, a battery unit 3, a suspension frame 4, and a driving device 5.

Wherein, the control unit 1 is mainly to provide the driving device 5 with the function to move forward and change direction. A handle 12 is attached to the top of the vertical shaft 11 of the control unit 2 so as to allow the user to hold and control it and the lower end of the vertical shaft 11 through a hub 13 is connected to a rotary plate 14 so that the rotary plate can move with the vertical shaft 11 synchronously. To ensure that the driving device 5 is fully controlled by the control unit 1, a connecting rod 15 is linked between the rotary plate 14 and the suspension frame 4 so that the driving device 5 mounted in the suspension frame 4 can move forward or turn left and right by way of traction of the connecting rod 15. In addition, a holding bar 131 is extended from the inner side of the hub 13 to join the support frame 2 and thus allows the control unit 1 to be fixedly attached to a lateral side of the armrest on the wheel chair.

Further, a fastener 16 is installed at a joint between the vertical shaft 11 and the handle 12 and at another between the vertical shaft 11 and the hub 13 respectively. By tightening or loosening an engaging knob 161 of the respective fastener 16, the handle 12 can be rotated and adjusted to a suitable inclination and fixed in position. The vertical shaft 11 can be adjusted to a suitable inclination angle to comply with the needs of different users so that any user can operate the wheel chair with the utmost comfort due to a factor of human engineering being involved.

The two support frames 2 are set up facing each other with the open end of the L shaped joining pipe 21 thereof being connected to a channel clamp 22 so that the two support frames 2 can fit with the two respective transverse rods at a base of the wheel chair so that at least one clip 23 can bind up the opening of the channel clamp 22 tightly to enclose and retain the transverse rods in position firmly. One of the support frames 2 has the joining pipe 21 thereof fitting and engaging with and the holding bar 131 so that the control unit 1 can be fixedly attached to a lateral side of the armrest.

The battery unit 3 is the power source of the wheel chair and consists of a box stand 31 where at least one battery 32 is installed on the top thereof while a stationary tube 33 is fixed at the bottom thereof to fit with a movable tube 34 transversely so as to comply with the spacing between the two transverse rods. Furthermore, joining tubes 331, 341 are vertically attached to the stationary and movable tubes 33, 34 respectively so as to engage with the vertically disposed joining pipes 21. Thus, the battery unit 3 can then be supported between the two transverse rods.

The suspension frame 4 is a U shaped frame 41 with an opening thereof fixedly attaching with the driving device 5. The suspension frame 4 at the top thereof is connected to the stationary tube 33 through a hollow shaft 42 so that it is possible for the frame 41 to move rotationally. The suspension frame 4 at the bottom thereof is connected to one end of the connecting rod 15 so as to be pulled by the connecting rod 15. A shock absorption spring 43 is placed between the top of the suspension frame 4 and an output part 52 of the driving device 5 in order to provide the effect of sudden shock.

The driving device 5 is composed of an electric motor 51, an output unit 52 and a driving wheel 53. Wherein, the output unit 52, during the implementation, can be assembled with components such as a turbine reducer, pulleys or gears. When the motor 52 is turned on, it will allow an output shaft 521, which is laterally extended from the output unit 52, to rotate in the forward or reversed direction according to the user's control and the output shaft 521 can in turn move the driving wheel 53 forward or backward. The characteristic of the present invention is that the driving wheel 53 is connected to a manual controller 54, that is, the axial hole 531 of the driving wheel 54 at both ends thereof is attached with a bearing 532 respectively at least two catch holes 533 are provided at an outer flange surrounding the axial hole 531. An engaging groove 522 is disposed on the output shaft 521 longitudinally to pass over the two bearings 532 and a follower disk 541. A follower disk 541 is provided with a key 542 and a through hole 543 respectively corresponding to the engaging groove 522 and the catch hole 533 so that the follower disk 541 can rotate synchronously with the driving wheel 53. A lock disk 544 is attached to the outer wall of the follower disk 541 for being pierced through with a relay pipe 546 and an engaging projection 545 sticks out to correspond to the catch hole 533 such that the engaging projection 545 can pass through the through hole 543 and be inserted into the catch hole 533 to make the lock disk 544 rotate with the driving wheel 53. Besides, the lock disk 544 at the other side thereof has a spring 547 and a washer 548 being placed on after another so as to be passed through with an axial bolt 549 for being fastened to the output shaft 521. Hence, once the battery 32 of the battery unit 3 is depleted, the driving wheel 53 is incapable of turning. At this moment, the only thing has to be done by the user is to hold and pull the lock disk 544 outward along the relay pipe 546. Under this condition, the spring 547 is compressed and the engaging projection 545 can be free from both the catch hole 533 and the through hole 543 such that the lock disk 544 can be rotated eccentrically to lose joining movement with the driving wheel 53 and the driving wheel 53 becomes in a state of being without traction. Right at the time, the user can push the holding part and rotates and moves two large wheels at the two lateral sides of the wheel chair with the driving wheel being in an idle state and acting as a following wheel.

Figure 2:
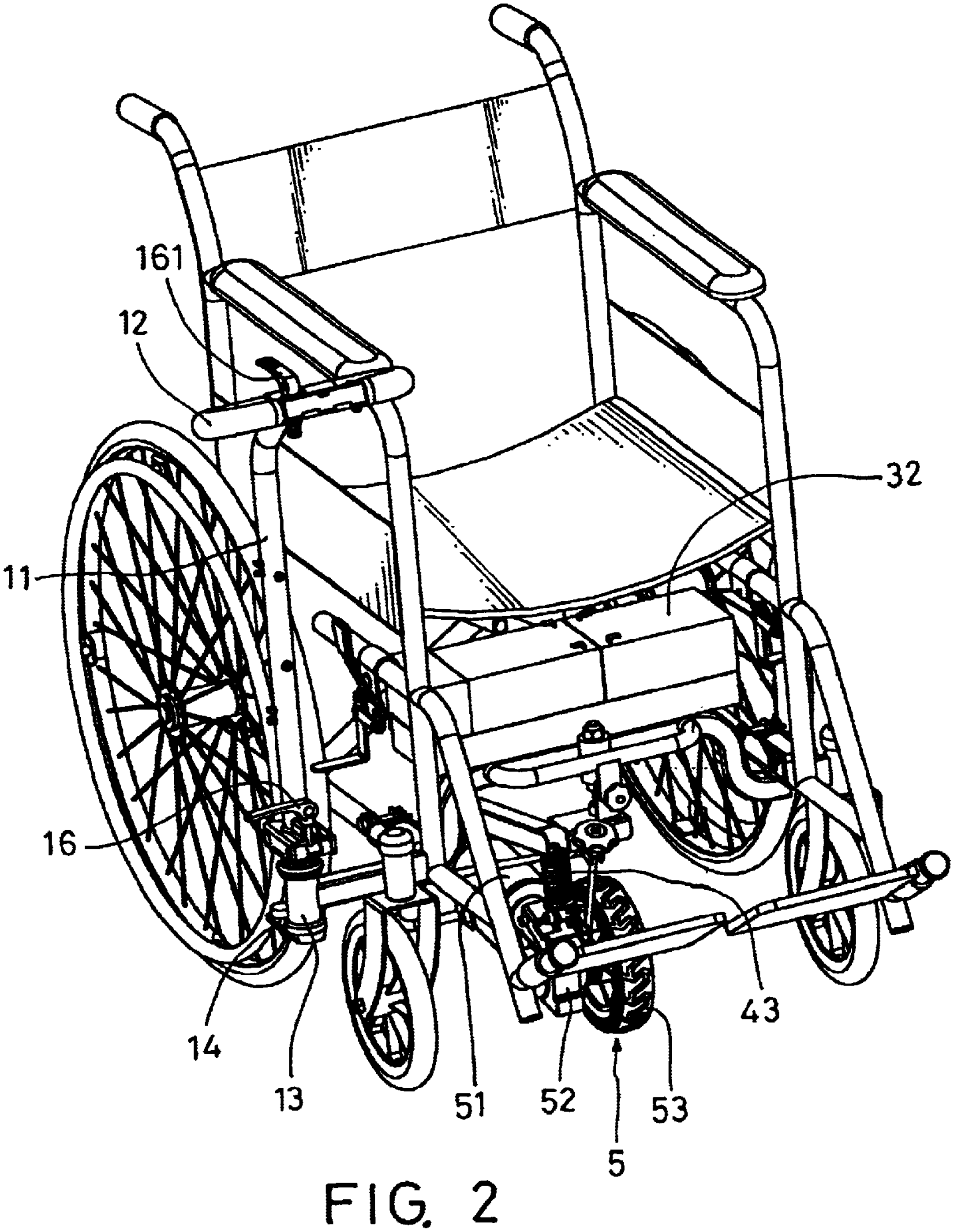
FIG. 2 is an assembled perspective view of the transmission mechanism and the wheel chair shown in FIG. 1.
Figure 3:
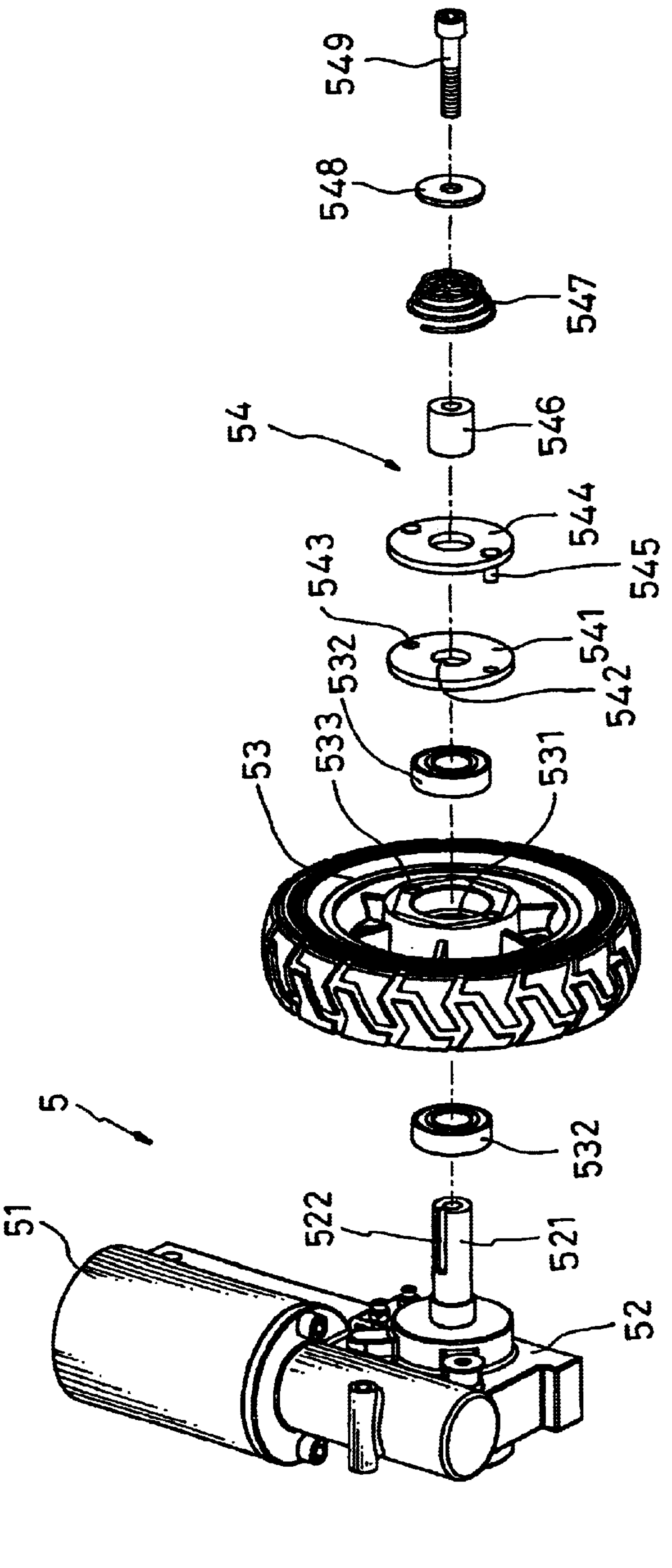
FIG. 3 is an exploded perspective view of a driving device in the transmission mechanism shown in FIG. 1.
Figure 4:
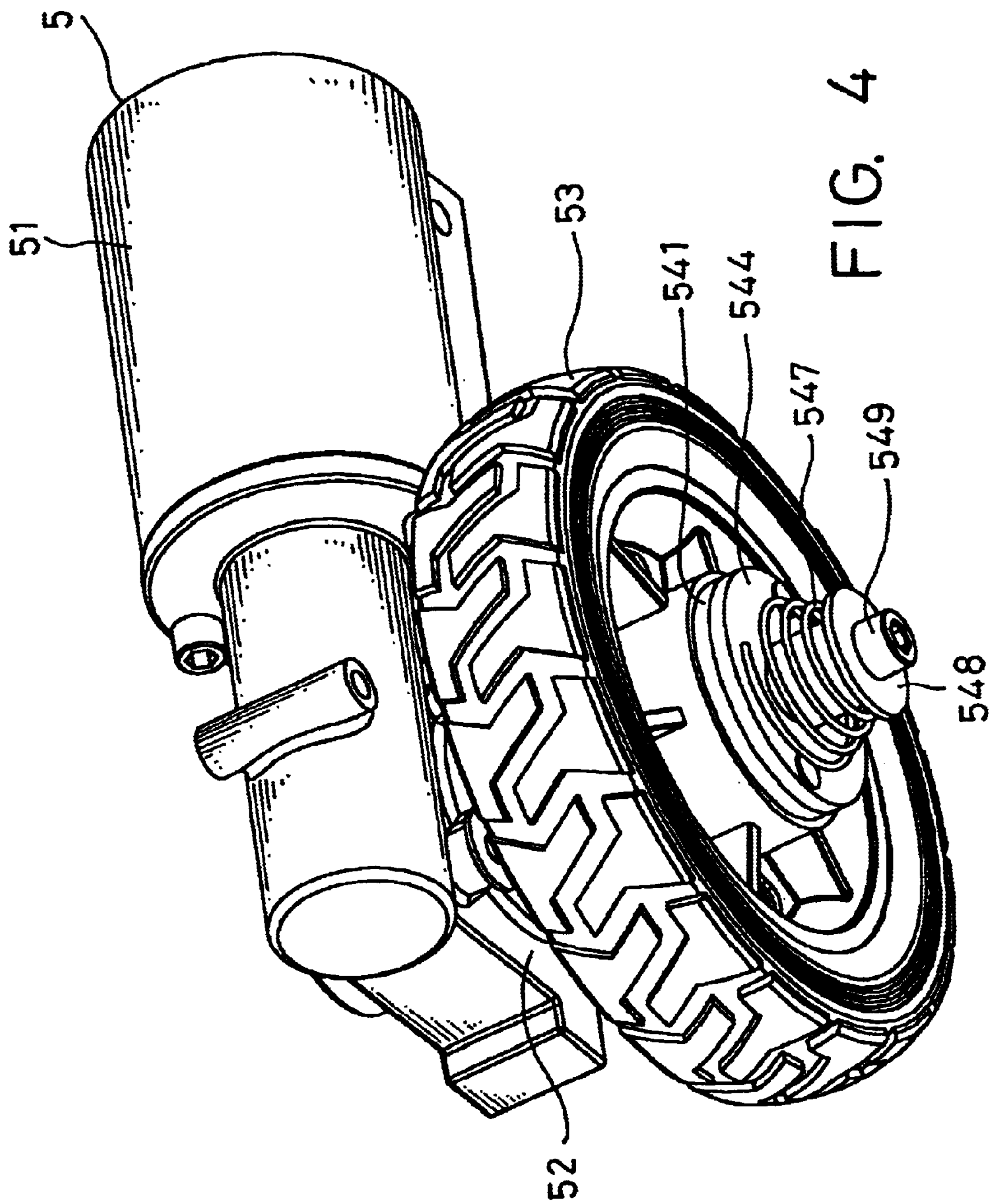
FIG. 4 is an assembled perspective view of the driving device shown in FIG. 3.

With the help of the previously mentioned explanation, the wheel chair can be assembled with DIY and become a finished product as shown in FIG. 2. By controlling the switch installed on the handle 12, the driving wheel 53 can move forward and backward. When trying to make a turn, the user just has to hold the handle 12 and rotate it, which will make the driving wheel 53 in between the two front wheels to turn as well. This shows how easy the wheel can be controlled.

Accordingly, by way of the implementation of the present invention, an advantage thereof is that the present invention can be associated with any of the available wheel chairs. Hence, the transmission mechanism of the present invention can be popularized in families, hospitals, old folk homes, or rehabilitation organizations that already own the wheel chairs so that it is not necessary to acquire the expensive electric movable wheel chair instead. Besides, when the battery unit runs out of power, the manual device can be adjusted to make the driving wheel free from actuating the lock disk and becomes idle and the wheel chair is then resumed to the original manual movement control by pushing with hands. Furthermore, transmission mechanism of the present invention does not have complicated gearbox and chair structure design, so that cost of production will be greatly reduced and achieve the popularity and low cost goals that the conventional electrical wheel chairs will never reach.

While the invention has been described with reference to the a preferred embodiment thereof, it is to be understood that modifications or variations may be easily made without departing from the spirit of this invention, which is defined by the appended claims.

What is claimed is:

1. A detachable transmission mechanism for a wheel chair, comprising:

a control unit, having a vertical shaft at an upper end thereof being attached with a handle, the vertical shaft at a lower end thereof passing through a hub and being connected to a rotary plate so that the vertical shaft moves synchronously with the rotary plate;

two support frames, being set up facing each other, each of the support frames having an L shaped joining pipe with an opening side thereof being connected to a channel clamp respectively, one of the joining pipes being connected to a holding bar extending from a side of the hub;

a battery unit, having at least one battery being placed on top of a box stand with two lower sides thereof having a joining tube being connected to the joining pipes and thus fixing the battery unit in position;

a suspension frame, being a U shaped frame with an upper part thereof being connected to the battery unit through a hollow shaft and a lower part thereof being connected to the rotary plate via a connecting rod;

a driving device, having an electric motor and an output unit being installed inside the suspension frame and an output shaft of the output unit being connected to a driving wheel;

whereby, the channel clamps of the two support frames are connected to two lower transverse rods of an existing wheel chair and the joining tubes at two sides of the battery unit are connected to the joining pipes so that the battery unit can be fixed beneath a seat of the wheel chair; furthermore, the control unit is positioned on one side of one of armrest of the wheel chair so that when the handle is rotated, the vertical shaft, rotary plate and the connecting rod move and in turn rotate the suspension frame as well as the driving device; and when control switch is turned on, the driving wheel rotates in either forward or reversed direction and thus moves the wheel chair forward or backward.

2. The detachable transmission mechanism for a wheel chair as defined in claim 1, wherein an adjustable fastening knob is installed between the vertical shaft and the handle so that the inclination angle of the handle is changeable.

3. The detachable transmission mechanism for a wheel chair as defined in claim 1, wherein an adjustable fastening knob is installed between the vertical shaft and the hub so that an inclination angle of the hub is changeable.

4. The detachable transmission mechanism for a wheel chair as defined in claim 1, wherein a U shaped opening of the channel clamp is attached firmly to the transverse rod with at least one lock bolt.

5. The detachable transmission mechanism for a wheel chair as defined in claim 1, wherein the box stand of the battery unit at a bottom thereof is fixedly attached to a stationary tube and a movable tube fits with the stationary tube to comply with a spacing between the two transverse rods with the stationary and the movable tubes at outer sides thereof being attached to a joining tube respectively so as to connect with both of the joining pipes firmly.

6. The detachable transmission mechanism for a wheel chair as defined in claim 1, wherein a shock absorption spring is disposed between a top of the suspension frame and the driving device.

7. The detachable transmission mechanism for a wheel chair as defined in claim 1, wherein the driving device further comprises a manual controller with a follower disk and a lock disk with an engaging projection being installed at an outer wall of a driving wheel sequentially and an engaging groove being provided on a perimeter of the output shaft, which passes through an axial hole of the driving wheel and fits with a key of the follower disk for corresponding to the follower disk and the engaging projection of the lock disk is inserted into a through hole in the follower disk and a catch hole in the driving wheel so that the lock disk moves with respect to the driving wheel; the lock disk fits with a relay pipe and a spring and washer are placed in sequence with a fastening bolt being arranged to pass through and lock onto the output shaft;

whereby, making use of the lock disk being moved along the relay pipe and pulled outwards, the spring is compressed and the engaging projection is free from both the catch hole and the through hole before a rotation is conducted with the lock disk in lap contact with the follower disk at a surface thereof so that the driving wheel loses traction thereof and becomes idle.

8. The detachable transmission mechanism for a wheel chair as defined in claim 7, wherein the axial hole of the driving wheel at both ends thereof is attached with a bearing respectively.

9. A driving device in a wheel chair, comprising:

an electric motor and an output unit, having an output shaft extending laterally; and a driving wheel, being connected to the output wheel; characterized in that:

the driving device further comprises a manual controller with a follower disk and a lock disk being installed at an outer wall of the driving wheel sequentially and an engaging groove being provided on a perimeter of the output shaft, which passes through an axial hole of the driving wheel and fits with a key of the follower disk for corresponding to the follower disk and an engaging projection of the lock disk is inserted into a through hole of the follower disk and a catch hole in the driving wheel so that the lock disk moves with respect to the driving wheel; the lock disk fits with a relay pipe and a spring and washer are placed in sequence with a fastening bolt being arranged to pass through and lock onto the output shaft;

whereby, making use of the lock disk being moved along the relay pipe and pulled outwards, the spring is compressed and the engaging projection is free from both the catch hole and the through hole before a rotation is conducted with the lock disk in lap contact with the follower disk at a surface thereof so that the driving wheel loses traction thereof and becomes idle.

10. The driving device in a wheel chair as defined in claim 9, wherein the axial hole of the driving wheel at both ends thereof is attached with a bearing respectively.

* * * * *